Alex. C. Twining,
Manufacture of Salt &c. by Freezing.
[95.]
No. 119,252.    Patented Sep. 26, 1871.
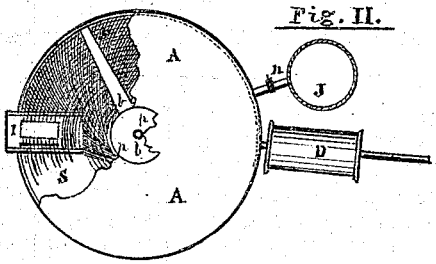
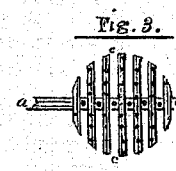
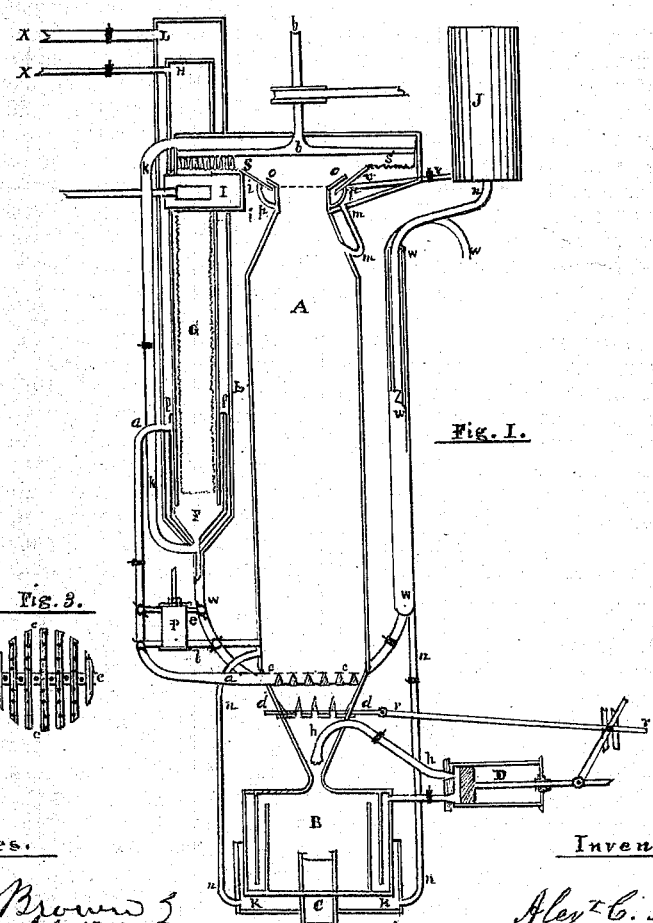
Witnesses.    Inventor.

UNITED STATES PATENT OFFICE.

ALEXANDER C. TWINING, OF NEW HAVEN, CONNECTICUT.

IMPROVEMENT IN APPARATUS AND PROCESSES FOR THE MANUFACTURE OF SALT.

Specification forming part of Letters Patent No. 119,252, dated September 26, 1871; antedated September 25, 1871.

*To all whom it may concern:*

Be it known that I, ALEXANDER C. TWINING, of the city and county of New Haven and State of Connecticut, have invented a new and useful Apparatus and Process for Manufacturing Salt, and for precipitating other substances from solution by refrigeration or freezing; and I do hereby declare that the following is a full and accurate description of the same for use of those who desire to construct and operate the invention, reference being had to the accompanying drawing.

My general plan or process is to freeze the water or liquid, holding the salt in solution in a containing-vessel or refrigerator, where, as stated below, it is cooled down by evaporation of a volatile liquid in a coil or a cluster of interior cooling-pipes, or by any system you prefer—as, for example, frozen in an exhaust or expansion-vessel by the cold vapor or mass of a suitable volatile liquid rising through the water, &c., in the vessel, and evaporated by a pump or other apparatus, X, (not shown in the drawing,) according to an improved method of freezing and cooling described and claimed by, in, and for a patent heretofore applied for, but not herein so described or claimed otherwise than in and for a peculiar combination and purpose hereinafter specifically stated; and then to transfer automatically the ice or frozen mass by an air-tight re-reciprocating or rotary contrivance to another vessel or condenser, made air tight like the first, and therein to use this frozen mass for recondensing the vapor of the volatile liquid, (or "volatile," as I henceforth term it,) to be itself used over again by injection into the first-mentioned or evaporating-vessel. By this last employment or means the liquefaction of the frozen mass becomes an effective auxiliary for condensing the vapor, tension in the condenser being also kept low and economy of space promoted, as well as cheapness of construction, by dispensing mainly, if not wholly, with the ordinary pipes or coils and the cold-water current around them, in case the volatile is not soluble in water or the solution used to any appreciable extent.

To make this clear I refer to the accompanying drawing, in which Figure I is a vertical section and view of the apparatus. Fig. II is a horizontal or ground view, and Fig. III is an auxiliary horizontal view; and for a primary purpose, and as a type of all other processes, let the precipitation of salt from sea-water or brine be the operation or process to be performed.

Let the elevated tank J contain the brine or solution which is to flow or to be pumped into the exhaust or refrigerating-vessel A, and fill it to the height, say, of the broken line *o o* or near it. The brine, before entering the tank J, or else in some part of its circuit *n n n* from the tank or pump to the refrigerator A, may be cooled by any known and available method or apparatus Z, (not shown,) and by embracing in that circuit, as part thereof, the brine-cooler K, which envelops the vessel B that holds the precipitated salt at its low temperature. By this or the like means the cold precipitate is incidentally made subservient in the system of means for cooling the brine beforehand. The latter, after entering A, is cooled down by any system you prefer, whether by a coil or cluster of interior cooling-pipes, or, better, by injecting or admitting a volatile insoluble in water, or its cold vapor through orifices in a colander, or in the horizontal stack of pipes *c c*, to be hereafter more particularly described. This volatile, evaporated by the exhaust of a pump or other apparatus, X, (not here shown,) rises in drops or in bubbles of vapor, or in both, and the latter escape above *o o* and by the eduction-pipe *k k* into the condenser H. During this operation the brine is put into progressive congelation, and becomes interspersed with ice-crystals which rise to the surface at or about *o o*, where there will be formed a floating stratum of uncompacted or disintegrated ice in small crystals or masses. The vessel A should next be cleared of this floating stratum; and to effect this clearance I pierce or enter that with a reciprocating, or, better, with a rotary skimmer, as I term it, represented by I in the drawing, and to be described particularly further on. The ice thus removed may be used in form as it is, for any desired purpose; or it may be compacted into blocks or cakes by suitable compressing mechanism; or for the simple purpose of obtaining the salt it may be delivered into the air-tight condenser H, into which *k k* also, or at the same time, delivers the vapor of the volatile when that last is the means of refrigeration employed. The vapor is condensed by the ice with a rapidity somewhat analogous to the like of steam in the condenser of a steam-engine; but the rapidity will depend upon the state of comminution of the ice and upon the free access of the vapor to and through it. The recondensed vapor or volatile now passes into the eduction-pipe *a a a*, which conducts it, by aid of pump P, if necessary, and by suitable pipes and cocks, as shown, to the colander or stack *c c*, to be again injected or admitted into the brine in A in process of evaporation by the exhaust. It will be understood, of course, that if the cooling in A is by a volatile evaporated in a containing-coil or cluster of pipes, as described, the eduction-pipe *k k* and the induction-pipe *a a*, respectively, will be so joined to the coil or pipes as to conduct the vapor by the first into the condenser, and the restored liquid by the last into the pipes. But to avoid the entrance of water with the recondensed vapor or volatile into and through *a a a*, the lower part of H, shown by F *f f*, is made to duplicate around at that part, as shown in the drawing, in order to separate the volatile completely, and the conduit *a a* enters only the outer shell or chamber F *f f*, and not into H directly. Since there is supposed to be more than atmospheric tension in H and a much-diminished tension in A, the injection or admission of the volatile from the former into the latter is automatic; but in other circumstances a pump, P, must be employed, and also the like of the clearance of H through the exit-pipe F *w w;* but in still other circumstances the same or a like pump must be used to draw the water of liquefaction from H through the last-named pipe. But this escape-water, being still cold, may be used for condensation-water around the condensing-coil or pipes of Z, above mentioned; or it may flow or be forced by P through *w w w*, which surrounds the brine-pipe *n n n*, the current in the two being in opposite directions. I also propose to envelop H by a sheath or vessel, L L L, into which the exit-pipe *k k* discharges the vapor of exhaustion and makes it flow between the sheath and H on the outside of the latter till it comes to the pipe L X, which leads, in the direction of the arrow, to the exhaust of the pump or apparatus, while X H leads from the condensing-stroke or chamber of the apparatus to the condenser H, which last pipe, in fact, may envelop the one just before mentioned. In short, I employ the cold escape vapor from A and the cold water of liquefaction from H for any purposes and in any manner available for refrigerating processes. In order to a better exposure and isolation of the ice in the condenser I make the skimmer I to deliver the ice into a cylinder or cylinders, G, set within H, and made of wire-gauze or of sheets, forming as many such compartments or cylinders as may be found expedient, and with numerous small perforations to allow the vapor free access to and permeation of the mass of comminuted ice; but to allow the recondensed volatile and the water of liquefaction to flow down toward F, and to be separated mutually by their difference of gravity, the water passing off through F *w w*, and leaving the volatile to pass off by *a a*. I next describe the skimmer I in its essential features. The casing *i i i* penetrates or enters H without isolating its upper from its lower parts, but leaving H open to F. The cylinder I fits and rotates air tight in this casing. The casing closes air tight both upon the condenser and the refrigerator, but has two rectangular openings—one at its lower part into H or G, and one directly opposite into the flat cylindric expansion S S of the refrigerator. The under containing surface of S S is a cylindrical ring from S inward as far as to the top of the inverted conical frustum *o o*. This frustum-shaped segment of A does not necessarily unite with the cylindric neck immediately beneath, but it may, if desired, leave an opening into the hollow collar *p p*, which unites the frustum to A; and this opening is so inclined on every side, or so far round as desired, that a liquid issuing under pressure from *p p* into S S would make an upward current—"sweep," as I call it for the sake of distinction—on the frustum *o o*, and sweep up with itself everything floating in the frustum and leave it upon the circularring, which, being of wire-gauze or having a multitude of perforations, would let the liquid through into E, which last surrounds that part of A and discharges the liquid back into A by the pipe *m m*. It will readily be seen how in this way, if the regulated pipe *v v* connects J and *p p*, the superior level of the former will give rush enough to sweep the float-ice, before spoken of, onto the circular ring. This same, however, may be done by rotating arms beneath the shaft *b b*, and carried thereby. On that ring the ice is swept around by a brush or scraper, carried under and with the rotating arms *b* S, by the revolving shaft *b b*, and falls at each turn or conjunction into the above-named rectangular opening in the cylindric ring and into the opening in 1 beneath it. It will now have been washed of its concentrated brine and at the same time will have been drained by the sieve or gauze. Now the cylinder I is hollow and opens by the rectangular space, seen at its middle in the drawing, alternately during its revolution into the upper and the lower openings of the casing. Now let the revolutions of *b* S be even with or some even multiple of the like of I, and also bring the openings of *s s* and 1 periodically together. When these are thus in conjunction it is obvious that the ice will fall into I, and then, a half revolution after, will fall into H or G, or otherwise outside of A. But if the object simply is to make granulated or disintegrated ice and deliver it outside the refrigerator, the jet and conical frustum are not needed. Indeed, for this simple object the scraper *b s* and the gauze ring might be omitted, and the pump or apparatus P be used to draw and force back into A, through *e l*, the liquid drained from G. The auxiliary, Fig. 3, shows the hollow bars or triangular pipes *c c c c* with holes at top, through which the expanding gas or vaporizing volatile is admitted or rushed into A. The bars are parallel and hollow, and their hollows communicate through the similarly-shaped connecting-pipe *a a* along their middle. The sharp triangular shape is calculated not to impede the settling of the salt down into B, and the holes are protected when necessary, not to become clogged by the deposit. This settling is also facilitated by the circulation-pump D, which by its stroke one way draws out of B and into itself, and by the return stroke throws the contents back into the lower part of A through $h\ h$, covered by wire-gauze, if necessary, over the downward opening of the latter. There might be, also, a diaphragm, $d\ d\ d$, made of parallel triangular bars, and the openings between the latter be alternately covered and uncovered by the plates of $v\ v$ sliding backward and forward, as in the drawing, or with some better equivalent apparatus to determine the recurring rush into B. The cylindric vertical diaphragms in the latter are meant to avoid drawing salt into the circulation-pump. C is a rotary cylinder, on the principles of I, to deliver the salt outside of B. If any volatile adheres to the salt it may be expelled by heat or exhaustion, or both. Other impurities will have their appropriate modes of separation.

That prime feature among my claims, in the foregoing, which consists in employing the ice formed by refrigeration as a condensing agent in a separate vessel may be varied as to its mode of application in a way and by an apparatus which I will now essentially although briefly describe, but which particular apparatus and operation I reserve, without embracing it in my claims in this specification, for another patent, which I intend to apply for. The two vessels H and A may be fashioned and furnished both alike and of equal dimensions, and both may enter similarly into B. The skimmer, and parts specially and exclusively relating to it—such as the current sweep of brine and the revolving brush or scraper—may be dispensed with. Each vessel alike will have stacks of pipes $c\ c$ to inject a volatile or its vapor; also, the wire-gauze compartments G to hold and expose the ice. The exhaust-pipe L X will branch into two precisely alike—one branch for each vessel, and a two-way cock will alternate them, opening one and shutting the other. Precisely the same thing will be true of the condense-pipe X H; also, of the brine-pipe or conduit $w\ w\ w$; also, of the exit-pipe $n\ n\ n$ for the water of liquefaction; also, of the pipes $a\ a$ to the stacks, and of every other in use herein; also, there will be a connecting-pipe, worked by an exhaust and force-pump, to draw the concentrated and cold brine out of one vessel and force it into the other when freezing has gone far enough in the first; and by simultaneously and automatically changing all the cocks the actions will become interchanged. That vessel which was the refrigerator will now have become the condenser, and vice versa. Then, when ice is sufficiently abundant in the second vessel, simply reverse the cocks, and the interchange will be established back again in the first-named condition, and so on alternately and continuously. The two vessels will thus be, each in turn and for the time being, the identical refrigerator and condenser herein described. The salt will be received into B from both vessels.

What I claim, and desire to secure by Letters Patent, is as follows:

1. The refrigerator, in combination with the volatile and its vapor and the skimmer, or any combination substantially the same, as and for the purpose described.

2. The current-sweep, in combination with the circular ring and the revolving brush or scraper, with or without wire-gauze or perforations, substantially as and for the purpose described.

3. The employment in the condenser of the ice formed in the refrigerator and used for condensing the vapor of the volatile, substantially as described; also, the use of the wire-gauze or perforated-sheet compartments G in and as an attachment or part of the condensing apparatus or vessel used therefor.

4. The circulation-pump D, in combination with the vessel B or any equivalents thereof, as and for the purpose described.

5. The general combination, or any substantially the same, as and for the purpose described.

Washington, D. C., July 14, 1870.

ALEXR. C. TWINING.

Witnesses:
EDM. F. BROWN,
D. C. LAWRENCE.